Nov. 20, 1962 J. KAPLAN 3,064,332
ELECTRIC COMFORTER
Filed March 8, 1961

INVENTOR.
JULIUS KAPLAN
BY
*Kenwood Ross*
ATTORNEY.

3,064,332
ELECTRIC COMFORTER
Julius Kaplan, 51 Colony Acres Road,
Longmeadow, Mass.
Filed Mar. 8, 1961, Ser. No. 94,290
1 Claim. (Cl. 29—155.5)

The present invention relates generally to new and useful improvements and structural refinements in an electric comforter and is directed more particularly to the provision of a comforter, having general utility in the arts, wherein a heating layer of synthetic fiber or the like, having appropriate electrical conductive means provided therein, is disposed between upper and lower integral layers of fabric with all layers or plies being joined by stitching to form an electrically heated comforter.

It will be helpful to an understanding of my invention first to briefly consider some of the essential points and more important features and aspects thereof, so that same may be kept in mind during subsequent reading of the detailed description of the practical embodiment of my improvements and illustration thereof in the hereunto annexed drawing.

Accordingly, it is first to be noted that it is a principal object of the invention to provide an electrically heated three ply comforter having an inner ply of synthetic fibers, as for example a polyester condensation polymer formed from ethylene glycol and either terephthalic acid or methyl terephthalate, in the nature of "Dacron," a trademark for a product of E. I. du Pont de Nemours & Co., Inc., which is safe, washable, non-flammable, light in weight and is capable of providing a high degree of warmth and comfort to the user.

Another of the chief objects is to provide a three ply construction such that heat from the wiring is confined within the comforter so that the user may benefit therefrom without the danger of contact with hot wires.

It is a salient feature hereof to provide a comforter having a three ply construction so stitched as to provide channels or pockets through which electrical conductive means may be quickly and easily passed thus materially reducing the time required to "wire" the comforter wherefore manufacturing costs are substantially reduced.

According to another novel feature of the invention the three ply construction of the comforter insures the even generation of heat therethrough and increases the heat insulating properties of the comforter without occasioning a corresponding increase in manufacturing costs.

Still another feature worthy of particular note is the fact that the three ply comforter hereof is not subject to objectionable puckering or wrinkling and maintains a uniform thermal conductivity throughout its entire area.

According to a novel form of the invention the comforter hereof may be made of a smaller size whereby it may be utilized to advantage as a heated foot warmer or the like.

Without intending to place undue limitations upon the scope of the invention beyond what may be required by the state of the prior art, the particular embodiment may be briefly described as embracing the concept of forming an electrically heated comforter in three plies, comprising an upper ply of fabric in the nature of satin or the like, an intermediate ply of synthetic fibers in the nature of Dacron or the like, and a lower ply of fabric in the nature of flannel or the like, stitching all plies together along the adjacent longitudinal side edges thereof, additionally joining all plies by means of equally spaced, parallel, longitudinally extending rows of stitching to provide channels or pockets through which electrical conductive means may be passed, inserting an end of a heating element in the form of wire into the intermediate ply of synthetic fabric at an open unstitched edge of the three ply comforter, and passing the wire back and forth through said intermediate ply within each of the adjacent, longitudinally extending compartments or pockets, until the desired quantity of wire has been threaded into the comforter, at which time the ends of the wire are drawn from the comforter and the opposite open unstitched edges are stitched together to form a completed comforter.

In practice, the wire will be inserted at one open unstitched edge, passed longitudinally through the intermediate ply adjacent the first of the rows of parallel stitching to cause the end of the wire to emerge from the intermediate layer at the opposite open edge of the three ply comforter, at which time the end of the wire will be reinserted into the intermediate ply and passed longitudinally through said ply at a point which is disposed between the first and second rows of parallel stitching, to cause the end of the wire to emerge from the first mentioned open edge of the comforter.

This procedure of inserting the wire at an open unstitched edge and reinserting the wire at an opposite, open, unstitched edge is repeated until the wire has been passed between each of the rows of parallel stitching.

The said rows of spaced, parallel stitching will be of a lesser length than the length of the longitudinal side edges of the comforter. Thus the wire, when inserted or reinserted at either open end, may be pulled taut against the upper or lower ends of the rows of stitching, wherefore the wire is disposed well inwardly from the upper and lower horizontal edges of the comforter.

Experience has shown that by utilizing two persons to wire the comforter, the wiring function may be performed with ease and rapidity.

By way of example, assume that operator X is stationed at one open, unstitched edge of the comforter and that operator Y is stationed at the opposite, open, unstitched edge. X will insert the wire into the intermediate ply of synthetic fabric and will pass the wire between the first and second rows of parallel stitching to Y, who will reinsert the wire into the intermediate ply between the second and third rows of parallel stitching and pass the wire back to X. X will then pull the wire until it contacts the upper edge of the second of the parallel rows of stitching, thus imparting a U-shape to the wire disposed within the intermediate ply.

The procedure outlined above will be followed until the desired expanse of the comforter is wired, at which time the end of the wire is drawn from the comforter. Additional stitching or quilting may now be applied to insure against the accidental movement of the wire within the comforter, and the open ends may be stitched to form the completed comforter.

By pulling the wire taut against the upper and lower ends of the adjacent parallel rows of stitching, the wire is firmly set within the intermediate ply of synthetic fabric, and the possibility of any movement of the wire within the fabric is virtually eliminated, thus precluding any objectionable contact between portions of the wire within the comforter.

The objects and other incidental ends and advantages as set forth above will in part be obvious and apparent and will in part be more fully pointed out as the nature of the invention is better understood in the progress of the disclosure below. To the end of attaining these objects and advantages and others hereinafter reasonably appearing, it will be explained that the invention consists substantially in the combination, construction, configuration, location and function of parts, as herein described in detail.

It will be apparent, however, that the physical embodiment delineated, albeit the preferred exemplification, is only indicative of but one of the multiplicity of ways in and purposes for which the principles of the invention may be employed. Same is submitted as a best known embodiment of the invention in accordance with the patent statutes and is given with a view to illustrating and explaining the precise nature of the principles of the invention and their embodiment for practical use, in order that others skilled in the art to which the invention pertains may be enabled to adapt and modify them in numerous variations and modifications, each as may be best adapted to the conditions of any particular use.

The invention reverted to is not restricted or confined to said embodiment and same is not intended to be exhaustive of, nor limiting of, the spirit or scope hereof. That is, the precise construction of the figures of the drawing need not be slavishly followed as, of course, the electric comforter may have to be adapted or alternatively constructed or modified in accordance with any specific use contemplated therefor. Such adaptations and/or alternative constructions and/or modifications are intended to be comprehended within the meaning and purview and range of equivalence of the below subjoined claims, there being no intent to have this invention limited to or circumscribed by any specific details.

The objects of the invention are susceptible of attainment by use of constructions different in certain respects from that disclosed, such as minor changes and variations in dimensions, shape, form, proportion, integration, co-operation of material and/or type of subassembly and accessory, all without departing from the underlying principles, salient features, scope and spirit hereof.

While all of these objects are attainable in the preferred and disclosed embodiment, it is to be understood that, by utilizing the invention only in certain of its aspects, certain of the objects may be attained individually or in sub-groups without necessarily attaining all of the objects. That is, while the advantages of the invention as here outlined are best realized when all of its features and instrumentalities are combined, useful embodiments may be produced involving less than the whole.

The characteristic features which I consider to be novel with my invention, as to its construction and organization and as to its methods of manufacture and operation, will be better understood from a consideration of the following detailed description forming a part of this specification, when read in conjunction with the illustrations in the accompanying drawing, wherein like characters of reference are employed to designate like or corresponding parts throughout the several views and in which.

In the following description and in the appended claim, various components and details thereof will be identified by specific names for purposes of convenience. Although specific terms and expressions are employed for purposes of identifying various components, they are used in a generic and descriptive sense only. The phraseology or terminology herein employed is for the purpose of limitation and they are intended to be as generic in their application as the art will permit. They are not intended to exclude any reasonable equivalents of the features shown and described or portions thereof.

Figure 1:
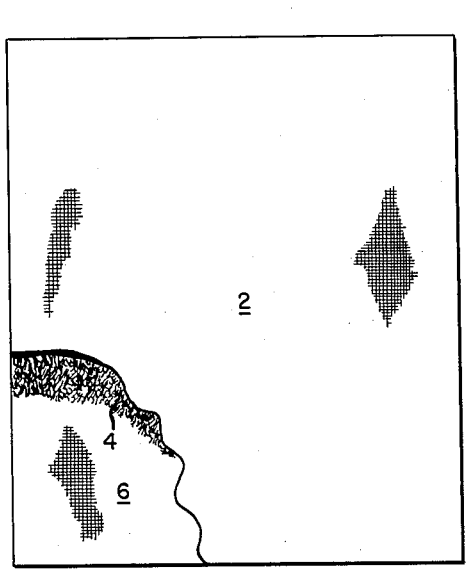
FIG. 1 is a plan view of the comforter of the invention before stitching and before the insertion of wire therein, with a portion having been broken away for purposes of clarity.

With continued reference now to the drawing, which illustrates a typical and preferred embodiment of the invention for the purpose of disclosure and forms a part of this specification, I have shown in FIG. 1 the basic components for a comforter comprising layers of plies of vertically aligned material including an upper or outer ply 2 which may be a fabric such as satin or the like, an intermediate ply 4 of insulating material or padding preferably in the form of loosely woven synthetic fibrous material in the nature of a polyester condensation polymer such as Dacron or the like, and a lower ply 6 which may be a fabric such as flannel or a similar material having the desirable qualities of warmth, resiliency and the like.

If desired, the upper ply 2 may have appropriate decorative patterns imprinted thereon.

Figure 2:
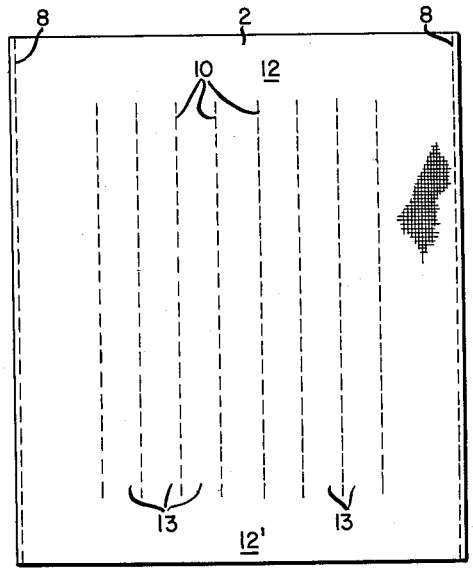
FIG. 2 is a plan view of the comforter shown in FIG. 1 illustrating the manner in which certain preliminary stitching is applied.

As an initial step in the formation of the comforter, the longitudinal edges of the adjacent superposed plies are stitched together as indicated by 8 in FIG. 2, or they may be secured together in some other suitable manner as by a binding element or the like.

The upper and lower plies, with the filling of synthetic fibers therebetween, may now be quilted to further secure the components together. The quilting will preferably be arranged to form a predetermined pattern or design, as described below.

Equally spaced, parallel, longitudinal extending rows of stitching 10 are provided and pass through each of the plies 2, 4, and 6. It will be observed that the rows of stitching 10 are of a lesser length than the length of the longitudinal side edges of the plies 2, 4 and 6 whereby borders or unstitched portions 12 and 12′ are provided adjacent the horizontal upper and lower edges respectively of the comforter.

The parallel rows of stitching 10 form compartments or pockets 13, into which compartments or pockets heating means may be inserted, as will subsequently be apparent.

As aforesaid, the stitching 8, along with the parallel rows of stitching 10, hold plies of material together and lock the intermediate ply of synthetic fibers in place.

Heating means, such as wire W, may be disposed between the upper and lower plies and within the intermediate ply of synthetic fabric by passing it back and forth through the loosely woven fibers of said intermediate ply in manner to be described.

The wire W is inserted into the intermediate ply at a lower horizontal edge of the comforter and is passed back and forth through the intermediate ply, the fibers of which may be easily pushed aside by the end of the wire, within the longitudinally extending compartments or pockets 13 to provide stretches or runs of wire 14, each of which is parallel to the rows of stitching 10.

Figure 3:
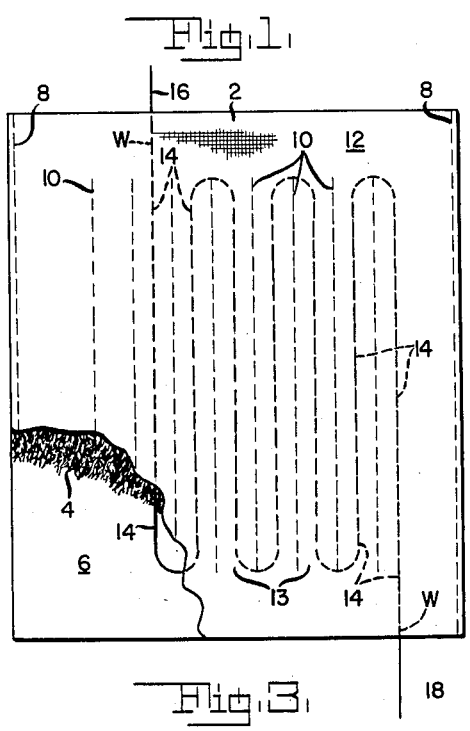
FIG. 3 is a plan view of the comforter shown in FIG. 1 after the insertion of a wire therein.
Figure 4:
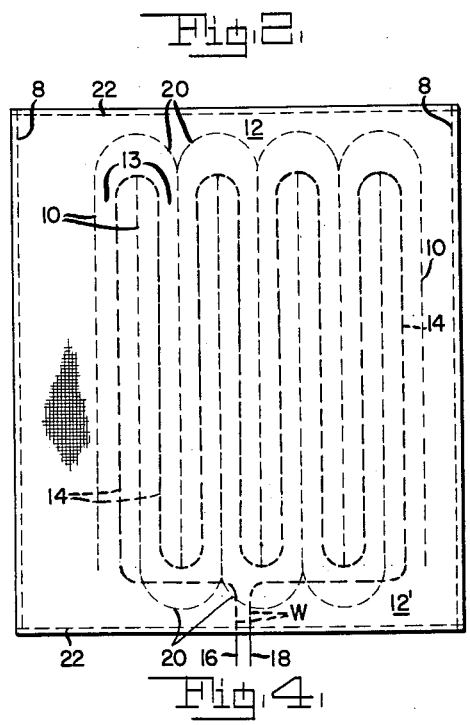
FIG. 4 is a plan view of the comforter of FIG. 1 completed in accordance with the present invention.
Figure 5:
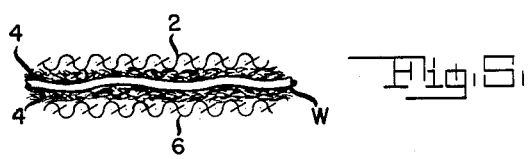
FIG. 5 is a fragmentary sectional view taken longitudinally through the comforter illustrating the disposition of the wire relative to the layers or plies thereof.

Adjacent stretches or runs assume a U-shape at the upper and/or lower extremities of the parallel rows of stitching 10 as appropriate as shown in FIGS. 3 and 4.

In practice, an end of the wire W will be passed back and forth within the compartments 13 between the parallel rows of stitching 10, and the wire will be pulled taut so as to contact the upper or lower extremity as appropriate of one of the rows of said adjacent, parallel rows 10. This passage of the wire W within the compartments 13 is easily accomplished since the opposite, horizontal edges of the comforter remain unstitched or unsealed during the wiring operation, and the fibers of the intermediate ply offer little or no resistance to the passage of the wire therethrough.

The wire W, constituting the heating element of the comforter will thus be arranged in a pattern such as will correspond or come within the area of the quilted portion of the plies and will be so arranged that any subsequent stitching through the plies will not injure the wiring.

As shown in FIG. 4 after the entire expanse of the comforter has been wired, the ends 16 and 18 of the wire W may be brought together and drawn out of the comforter at any desired point along an open horizontal edge thereof and will be connected to a suitable current control mechanism, not shown.

With the heating element disposed within the intermediate layer as described quilting or stitching 20 may be provided in the marginal portions 12 and 12' to preclude the accidental movement of the runs 14 of the wire.

Any suitable pattern of stitching may be utilized for this purpose, same not being limited to the design shown in the drawing.

As a final step in the completion of the electric comforter the horizontal upper and lower edges of each of the adjacent plies 2, 4 and 6 are stitched together as indicated at 22 in FIG. 4 or they may be secured together in some other suitable manner as by a binding element or the like.

It will be understood that the pattern of parallel rows of longitudinally extending stitching may be varied depending upon the particular desires or requirements of the user.

The comforter may be formed with equal facility with the parallel rows of stitching extending transversely of the longitudinal axis of the comforter without departing from the spirit and scope of the invention.

Too, by making the comforter hereof in a smaller size, it may be readily used to advantage as a foot warmer or the like.

Based on the foregoing, it will be seen that I have provided a truly novel electric comforter and method for forming the same.

It is believed that the gist of the invention will be clearly understood from the foregoing disclosure and accordingly, further analysis thereof at this point is considered unnecessary, as I have, in accordance with the provisions of the patent statutes, described the construction and principle of operation of my invention together with the form which I believe to represent the best embodiment thereof, to the end that others can, by applying current knowledge, readily adapt it for various applications without omitting features which, from the standpoint of prior art, fairly constitute essential characteristics of its generic and/or specific aspects. The substitution of equivalents and other changes, modifications and alterations as circumstances may suggest or render expedient, are reasonably contemplated, the invention being susceptible of such without departing from its real spirit or underlying principles.

The protection which is sought for this invention is covered by the language of the above specification and the spirit represented thereby.

The claim is desired to include within the scope thereof all of the suitable variations, modifications and equivalents by which substantially the results of the invention may be obtained through the use of substantially the same or equivalent devices or means. Accordingly, limitation hereof should only be made as determined by a proper interpretation of the prior art and the scope of the subjoined claim, in which it is my intention to claim all novelty inherent herein as broadly as possible.

I therefore particularly point out and distinctly claim as my invention:

The method of forming an electric comforter comprising, joining superposed layers of fabric and a layer of loosely woven synthetic fibers in the nature of a polyester condensation polymer therebetween adjacent their longitudinal edges, stitching all layers together by means of spaced parallel longitudinally extending rows of stitching to provide longitudinally extending channels, inserting a heating element in the form of wire into said intermediate layer between said fibers at an unjoined edge of said comforter, passing the wire back and forth through said intermediate layer within each of the adjacent longitudinally extending channels, and joining each of the unjoined adjacent edges of said layers of fabric and synthetic fibers.

References Cited in the file of this patent

UNITED STATES PATENTS

| | | |
|---|---|---|
| 2,323,478 | Lobl | July 6, 1943 |
| 2,327,756 | Adamson | Aug. 24, 1943 |
| 2,379,580 | Hendley | July 3, 1945 |
| 2,458,801 | Schwartz | Jan. 11, 1949 |
| 2,490,417 | Cochran | Dec. 6, 1949 |
| 2,706,768 | Kaplan | Apr. 19, 1955 |
| 2,708,234 | Kerr | May 10, 1955 |
| 2,708,235 | Kaplan | May 10, 1955 |
| 2,862,097 | Negromanti | May 31, 1958 |

FOREIGN PATENTS

| | | |
|---|---|---|
| 152,427 | Australia | July 17, 1953 |
| 642,625 | Great Britain | Sept. 6, 1950 |